July 22, 1958  R. C. CLARK  2,844,363
ANTICORROSIVE SEALED MAGNETIZED STIRRING BAR
Filed Oct. 4, 1955
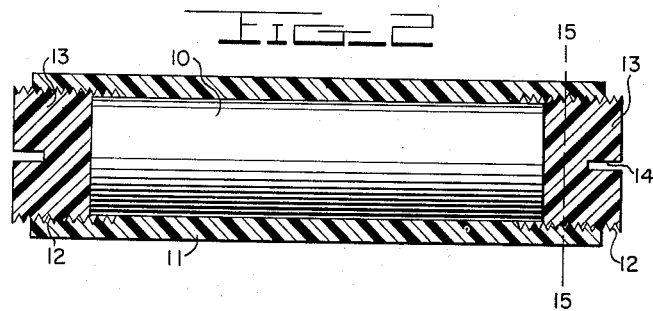
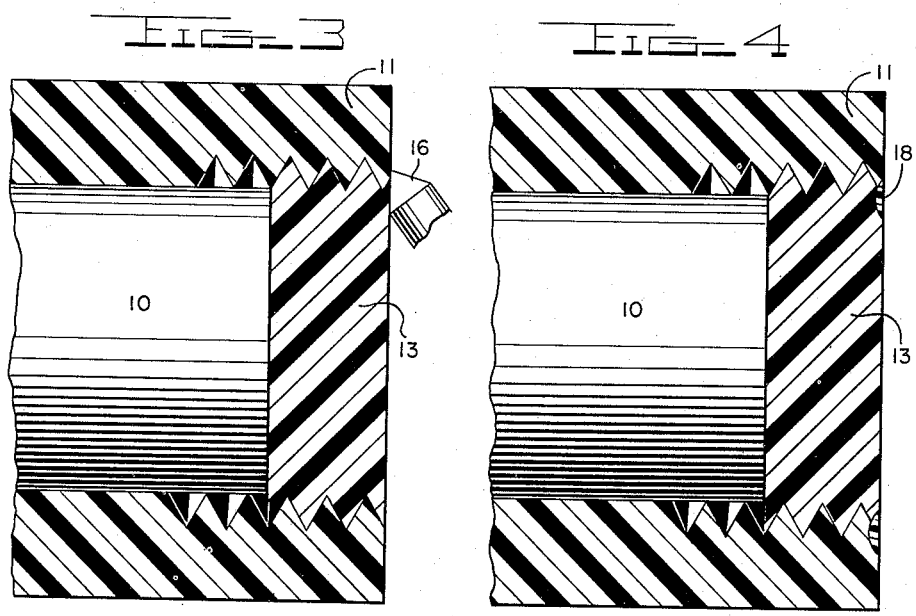
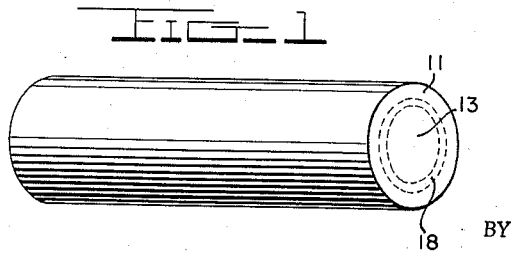
INVENTOR
ROBERT C. CLARK
BY
ATTORNEYS United States Patent Office
2,844,363
Patented July 22, 1958

2,844,363

ANTICORROSIVE SEALED MAGNETIZED STIRRING BAR

Robert C. Clark, Arlington, Va.

Application October 4, 1955, Serial No. 538,541

2 Claims. (Cl. 259—144)

(Granted under Title 35, U. S. Code (1952), sec. 266)

The invention described herein may be manufactured and used by or for the Government of the United States of America for governmental purposes without the payment of any royalties thereon or therefor.

The present invention relates in general to magnetic stirring systems wherein a liquid is stirred by means of a magnetic stirring bar placed therein and driven by a rotating magnetic field.

An object of the invention is the provision of a magnetic stirring bar structure highly resistant to solvents and corrosive reagents.

Another object is the provision of a stirring bar having a protective coating of the desired corrosive resistant qualities but of a less degree of hardness than glass, whereby to assure against mechanical injury to the rod element or any glass, liquid container in which used.

A further object is the provision of a magnetic stirring rod in which the magnetized rod element is encased in a protective casing of a plastic of the polytetrafluoroethylene type, known under the trade name of "Teflon."

A further object is the provision of a method of construction of such a device whereby a magnetized metallic stirring rod may be wholly encased in a plastic covering of substantial thickness of a plastic of the polytetrafluoroethylene type, hermetically sealed by fusion of the plastic material to form a continuous homogeneous covering with assurance against heat injury to the magnetized bar.

Other objects and advantages of the invention will be apparent from a perusal of the following specification and the drawings accompanying the same in which:

Fig. 1 is a perspective view about twice actual size of the finished article.

Fig. 2 is an axial cross-sectional view about three times actual size, of the article in an early stage of construction.

Fig. 3 is a much enlarged fragmentary detail sectional view of one end of the article just before the last stage of construction.

Fig. 4 is a much enlarged fragmentary sectional view of an end of the finished article showing the location of the fused sealing zone.

Referring to the drawings in detail, and first to Fig. 2, here 10 is the magnetized metallic bar which may be of any known or other suitable permanent magnet material such as one of the cobalt or tungsten magnetic alloys. Such materials are usually rather vulnerable to many corrosive reagents, and to overcome this objection the rod is wholly enclosed in a casing 11 of a plastic of the polytetrafluoroethylene type which is highly resistant to most solvents and corrosive reagents. However, as the fusing temperature of such plastics is in the neighborhood of 725° F. to 740° F., it is not practical to resort to encasement by molding, because at these high temperatures many of the desirable available alloys such as mentioned above may lose as much as 25 to 80 percent of their original flux. While encasement may also be accomplished by spraying on two or more coats of the plastic in the form of an aqueous dispersion and then baking, this also would not be practical, in the coating of a magnetized bar, in that such method would require baking at a temperature in the neighborhood of 725° F. According to the present invention the magnetized bar 10 is fitted into the tubular casing 11 of the highly resistant plastic, the parts being so dimensioned that the bar will fit in the casing with sufficient tightness to affect an appreciable compressional contact between the casing and the bar, the casing being of sufficient length to extend beyond the ends of the bar. The ends of the casing are internally threaded with the threads extending toward the center slightly past the ends of the bar. The ends or threaded openings 12 of the tubular casing 11 are closed by suitable externally threaded plugs 13 of the same plastic material, the external diameter of the plugs being made slightly larger than the internal diameter of the threaded opening 12 so as to thread into the opening under substantial radial compressional contact. Both plugs are thus threaded into the casing into abutment with the ends of the rod 10 and with sufficient force to exert substantial longitudinal or axial compressional contact between the threads of the plugs and the casing. To facilitate assembly the plugs may be provided with a kerf 14 to receive a screw driver. After assemblage as shown in Fig. 2, the ends of the assemblage are cut off along a plane indicated by the dotted line 15—15 normal to the axis of the bar and casing and spaced a slight distance outwardly from the ends of the bar, say about the distance of three or four threads. This leaves the end of the assembly as shown in the enlarged view, Fig. 3, with a shortened portion of the plug 13 closing the end of the cylindrical chamber of the tubular casing 11 and mechanically locked therein by engagement of the complementary screw threads on the plug and in the inner wall of the end of the casing 11 under appreciable compressional contact due to the slightly oversized plug and abutment of the plug 13 against the end of the bar 10.

The tip 16 of a hot soldering iron is now placed against the outer annular edge 17 of the interface between the plug 13 and casing 11, now in slight compressional contact. Slow movement of the iron around this outer edge heats the neighboring material of the casing and plug to a temperature sufficient to fuse the parts together under pressure along an annular zone indicated at 18 in Figs. 4 and 1, the annular zone including the outer marginal edge of the interface between the plug and casing wall. The end of the casing thus becomes sealed over a homogeneous connection between casing and plug. Because of the local application of heat during a relatively short time and because of the low heat conductivity of the plastic material, the zone 18 may be brought to the fusing temperature or sufficiently near such fusing temperature to accomplish the homogeneous sealing without danger of unduly heating the magnetic bar. It will be noted that due to the fact that the plug and threaded portion of the casing are in appreciable compressional contact the fusing together of the contacting parts takes place under appreciable pressure. It will be noted that with the construction here disclosed the plastic casing may be made of any desirable thickness and still result in a continuous or homogeneous encasement of the magnetic bar by the highly protective plastic material of high fusing point.

The plastic casing, though tough and durable is of a hardness considerably less than that of the magnetized rod or any glass, liquid container in which it might be used, thus insuring against injury to the rod element or the glass container. It will be understood that the casing may be molded, machined or otherwise formed with one end closed so that only one closure plug will be necessary. To insure against voids between the plug and casing, an aqueous dispersion of the plastic may be applied to the complementary threaded portions during assembling.

While but one specific embodiment of the invention has been herein shown and described for the sake of disclosure, it is to be understood that the invention is not limited to such specific embodiment but contemplates all such modifications and variations thereof as fall fairly within the scope of the appended claims.

What is claimed is:

1. A magnetic stirring bar comprising a magnetized metallic rod element enclosed in a continuous homogeneous casing of a plastic of the polytetrafluoroethylene type, said casing having a cylindrical chamber closed by a closure plug of the same material as the walls of the cylindrical chamber in threaded engagement therewith under radial compressional contact, said plug and casing being sealed near their outer ends through a fused zone in the material of the sealed parts extending only around the outer marginal edge of the interface between the plug and casing and spaced from the rod by the intervening material of the casing and plug, whereby the magnetized rod element encased in the polytetrafluoroethylene type material is free of the deleterious effect of the high fusing temperature of the polytetrafluoroethylene type material.

2. An encased magnetic stirring bar comprising a magnetized metallic bar element, and a casing of a plastic of the polytetrafluoroethylene type, said casing comprising a main casing element having an opening closed by a plug of the same plastic material mechanically held in the casing and sealed by a fused joint at the outermost edge of the interface between the plug and casing consisting of a fused portion of plug and casing and spaced from the magnetized bar by intervening material of the plug and casing whereby the encased bar is free of deleterious effects as would result from the high temperature required to produce the fused seal.

References Cited in the file of this patent

UNITED STATES PATENTS

| | | |
|---|---|---|
| 2,350,534 | Rosinger | June 6, 1944 |
| 2,403,638 | Clark | July 9, 1946 |
| 2,410,190 | Townhill | Oct. 29, 1946 |
| 2,562,714 | Hawtof | July 31, 1951 |
| 2,602,596 | Jones et al. | July 8, 1952 |

FOREIGN PATENTS

| | | |
|---|---|---|
| 23,827 | Australia | Aug. 6, 1935 |